United States Patent [19]

Mori

[11] Patent Number: 4,662,106
[45] Date of Patent: May 5, 1987

[54] APPARATUS FOR PLANT CULTIVATION

[76] Inventor: Kei Mori, 3-16-3-501, Kaminoge, Setagaya-ku, Tokyo, Japan

[21] Appl. No.: 546,016

[22] Filed: Oct. 27, 1983

[30] Foreign Application Priority Data

Oct. 30, 1982 [JP] Japan .............................. 57-191239

[51] Int. Cl.⁴ ............................................. A01G 9/00
[52] U.S. Cl. ..................................................... 47/17
[58] Field of Search ................. 47/66, DIG. 6, 17, 47, 47/1.1, 69, 79, 27; 350/96.1; 362/32

[56] References Cited

U.S. PATENT DOCUMENTS

| | | | |
|---|---|---|---|
| 1,419,152 | 6/1922 | Lansing | 47/66 |
| 3,165,863 | 1/1965 | Duran | 47/47 |
| 3,348,922 | 10/1967 | Bose et al. | 47/17 |
| 3,481,073 | 12/1969 | Yoshida et al. | 47/17 |
| 3,532,874 | 10/1970 | Rosenast | 362/32 |
| 3,807,088 | 4/1974 | Jones | 47/17 |
| 3,810,327 | 5/1974 | Giansante | 47/17 |
| 3,930,335 | 1/1976 | Widmayer | 47/DIG. 6 |
| 4,057,933 | 11/1977 | Enyeart | 47/79 |
| 4,369,598 | 1/1983 | Beckwith | 47/66 |
| 4,510,555 | 4/1985 | Mori | 362/32 |

Primary Examiner—Robert A. Hafer
Assistant Examiner—Bradley M. Lewis
Attorney, Agent, or Firm—Jordan and Hamburg

[57] ABSTRACT

An apparatus for plant cultivation includes a sealed dark chamber and a sealed lighted chamber which accommodate a root portion and a stem and leaf portion of a plant respectively. The lighted chamber is defined by a transparent housing above the dark chamber and the lighting is provided by optical fibers. The dark chamber is supplied with nourishment, oxygen and the like, while the lighted chamber is supplied with $CO_2$-containing air which is controlled to a predetermined temperature and humidity. The supply of light occurs on a scheduled basis in accordance with a state of stomata of the plant.

14 Claims, 5 Drawing Figures

APPARATUS FOR PLANT CULTIVATION

BACKGROUND OF THE INVENTION

The present invention relates to an apparatus for cultivating plants under well nourished and lighted conditions.

The primary requisite for the cultivation of plants is adequately conditioning various factors related thereto such as light, nourishment, carbon dioxide ($CO_2$) and heat as well as ambient conditions including temperature and humidity. However, the effort to satisfy all these factors has brought about a problem in view of the atmosphere which is desirable for human beings. For example, excessive supply of $CO_2$ is harmful for human beings and excessive humidity or heat, undesirable.

SUMMARY OF THE INVENTION

It is therefore an object of the present invention to provide a plant cultivating apparatus which is capable of effectively raising plants while insuring the atmosphere required for human beings.

It is another object of the present invention to provide a simple and space-effective apparatus for plant cultivation.

It is another object of the present invention to provide a generally improved apparatus for plant cultivation.

An apparatus for cultivating a plant of the present invention comprises a base member for supporting a plant which has sealed dark chamber defined therein. The dark chamber accommodates a root portion of the plant. A support assembly supports a stem and leaf portion of the plant which protrudes upwardly from the base member. Lighting means is provided for supplying light for photosynthesis to the stem and leaf portion of the plant.

In accordance with the present invention, an apparatus for plant cultivation includes a sealed dark chamber and a sealed lighted chamber which accommodates a root portion and a stem and leaf portion of a plant respectively. The lighted chamber is defined by a transparent housing above the dark chamber and the lighting is provided by optical fibers. The dark chamber is supplied with nourishment, oxygen and the like, while the lighted chamber is supplied with $CO_2$-containing air which is controlled to a predetermined temperature and humidity. The supply of light occurs on a scheduled basis in accordance with a state of stomata of the plant.

The above and other objects, features and advantages of the present invention will become apparent from the following detailed description taken with the accompanying drawings.

DESCRIPTION OF THE PREFERRED EMBODIMENTS

While the apparatus for plant cultivation of the present invention is susceptible of numerous physical embodiments, depending upon the environment and requirements of use, substantial numbers of the herein shown and described embodiments have been made, tested and used, and all have performed in an eminently satisfactory manner.

Figure 1:
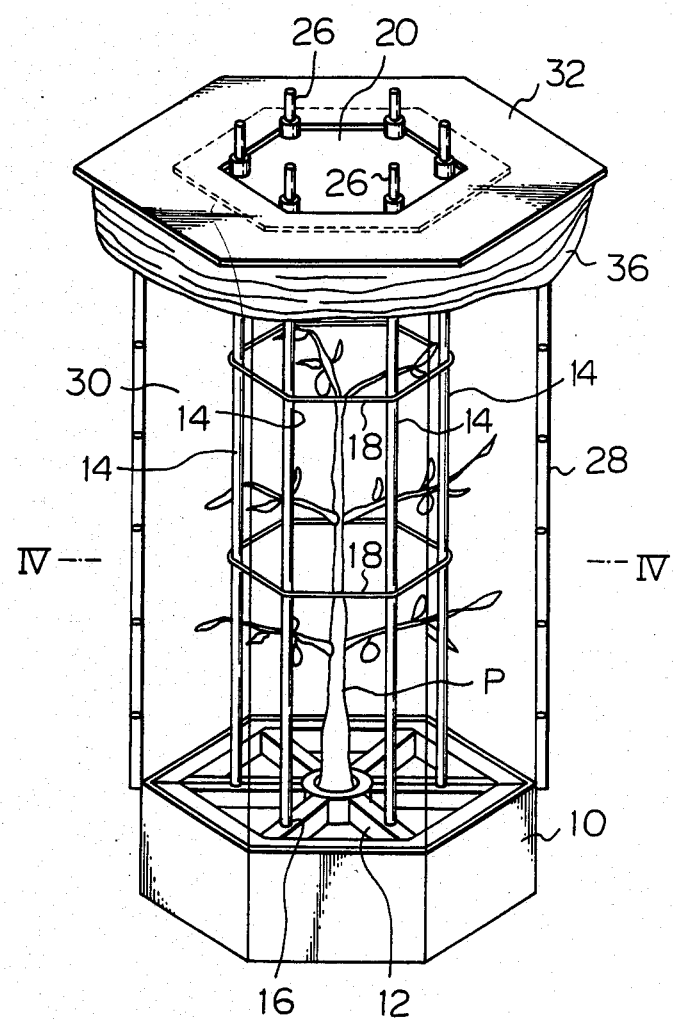
FIG. 1 is a perspective view of a plant cultivating apparatus embodying the present invention.

Referring to FIG. 1 of the drawings, an apparatus of the present invention includes a hollow base section 10 which is kept dark by a lid from above, although not shown in the drawing. A plant P has a root portion thereof accommodated in the dark base section or, as will be referred to as, dark chamber 10. Sufficient amounts of culture medium and water for nourishing the plant P are fed into the dark chamber 10 by a method well known in the art.

Figure 2:
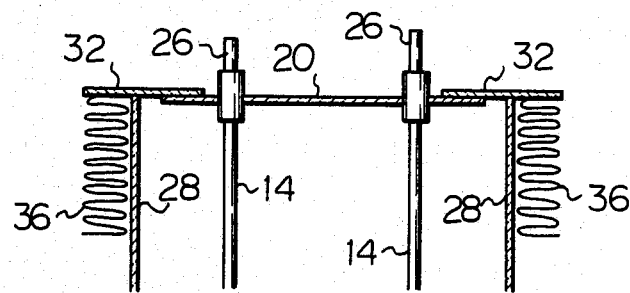
FIG. 2 is a fragmentary section of the apparatus shown in FIG. 1.

A support member 12 is disposed in the dark chamber 10 as illustrated. A plurality of columns 14 stand upright on the support member 12 with their lower ends received in holes 16 which are formed in the support 12. The columns 14 are rigidly retained together by beams 18 at some positions along the length thereof. This assembly of the columns 14 and beams 18 serves as a support for supporting a stem and leaf portion of the plant P. As shown in FIG. 2, an upper portion of the assembly is fixedly held and closed by an opaque lid member 20, for example.

Figure 3:
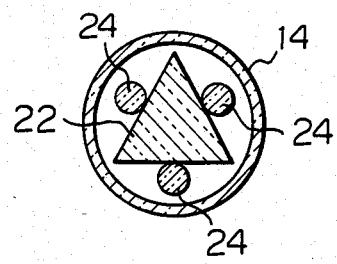
FIG. 3 is a cross-section of a column included in the apparatus of FIG. 1.

Referring to FIG. 3, each of the columns 14 comprises a transparent tube in which an elongate transparent member 22 having a triangular cross-section is disposed. Optical fibers 24 are also disposed in the transparent tube and respectively fixed in contact with the three sides of the triangular elongate member 22, so that light propagating through fiber optic cables 26 may enter the optical fibers 24 associated with the fiber optic cables 26. In detail, an apparatus for focusing sunlight or artificial light is located at those ends of the fiber optic cables 26 which are remote from the optical fibers 24. Light focused by the focusing apparatus is selectively or simultaneously introduced into the fiber optic cables 26 and therethrough into the optical fibers 24, thus being radiated from the optical fibers 24 to irradiate the plant P.

Photoradiators have been proposed in various forms such as one comprising an optical fiber on which a light diffusing material is locally deposited in order to allow light propagating through the optical fiber to be radiated through the light diffusing material. The principle of such a photoradiator is applicable to the optical fibers 24 shown and described. However, laying the optical fibers 24 on and along the respective sides of the triangular, transparent column 22 is advantageous over the above-mentioned structure because the light introduced from the optical fibers 24 into the triangular member 22 advances toward vertical angles while being reflected by adjacent two sides of the triangle and, in the meantime, the incidence angle to the two sides progressively increases to allow the light to be radiated with ease from the triangular member 22. In short, the optical fibers 24 on the triangle promotes effective supply of the light propagating therethrough to the plant P.

While the construction described so far suffices for effective cultivation of the plant by the sufficient supply of nourishment and light, photosynthesis will occur more effectively if carbon dioxide ($CO_2$) can be fed positively to the plant P. In accordance with the present invention, a transparent cover member or housing 28 defines a sealed lighted chamber 30 in which the plant P is confined. A lid 32 made of an opaque material, for example, is located on top of the housing 28 and lid 20 to define the sealed chamber 30 in cooperation with the housing 28. In this construction, carbon dioxide may be suitably fed into the chamber 30 by a method well known to the art.

Figure 4:
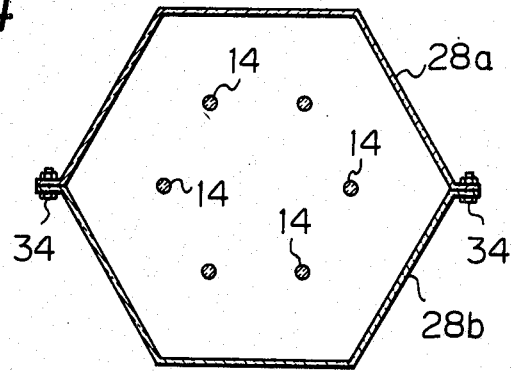
FIG. 4 is a cross-section along line IV—IV of FIG. 1.

As shown in FIG. 4, the housing 28 may comprise two housing halves 28a and 28b which are identical in shape and fastened to each other as by bolts 34 to form the sealed chamber 30.

The supply of light to the plant P for photosynthesis is needed when the stomata are open and not when they are closed. For more efficient photosynthesis, therefore, it is desirable to interrupt the irradiation and, at the same time, to screen the whole chamber 30 from externally derived light rays while the stomata are closed. In this particular embodiment, this is implemented by a curtain 36 which hangs at the transparent housing 28. While the stomata of the plant P are closed, the curtain 36 may be lowered to intercept the external light tending to enter the chamber 30. At the same time, the supply of light into the optical fibers 24 may be switched off to leave the plant P in complete darkness within the chamber 30. In this condition, the plant P shifts the product of photosynthesis toward fruits hanging thereon. Stated another way, cultivation of the plant P will proceed more effectively if the curtain 36 is lowered only when the product of photosynthesis is being shifted to the fruits.

While the supply of light to the apparatus may be switched on and off by monitoring the state of the stomata of the plant, a plurality of such apparatuses may be prepared to supply them with light alternately in order to attain more effective use of light. The light switching operation may be scheduled by estimating the period because the light supply control effected by actually monitoring the stomata would result in an intricate and expensive construction.

Figure 5:
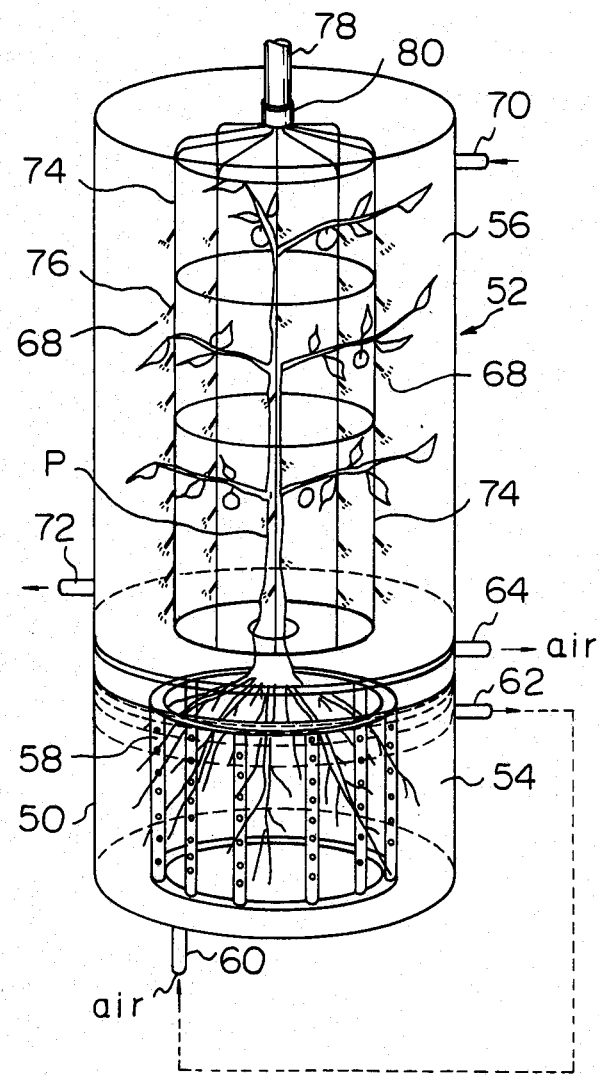
FIG. 5 is a schematic perspective view of another embodiment of the present invention.

Referring to FIG. 5, another embodiment of the present invention is shown and generally comprises a hollow base 50 and a transparent cover or housing 52. Again, the base 50 defines a dark chamber 54 and the housing 52, a sealed lighted chamber 56. The plant P has a root portion accommodated in the dark chamber 54 and a stem and leaf portion in the lighted chamber 56. An apertured tube assembly 58 is disposed in the dark chamber 54 in order to supply the root portion of the plant P with nourishment, oxygen and the like necessary for the growth thereof. Culture liquid, air and the like are circulated from a source (not shown) to the apertured tube assembly 58 and therethrough into the dark chamber 54 via an inlet tube 60. The waste liquid served the function in the dark chamber 54 is discharged from an outlet tube 62 to return to the source. Meanwhile, the air supplied oxygen to the root of the plant P is discharged through an exhaust tube 64.

Disposed in the sealed chamber 56 are a number of light sources 68 which are necessary for causing the plant P to perform photosynthetic reactions. $CO_2$, hot and humid air and the like are circulated into the lighted chamber 56 via an inlet tube 70 and out therefrom via an outlet tube 72. The atmosphere inside the lighted chamber 56 is conditioned to specific properties of the plant P, e.g., to a humidity of 70%, a $CO_2$ concentration of 3%, and temperature of 25°-28° C.

The light sources 68 in the chamber 56 may be of any desired type so long as it is capable of emitting light of a wavelength which is needed for photosynthetic reactions, e.g., xenon lamps. It is desirable, however, to employ light sources which do not entail heat, in view of the fact that heat is unnecessary for photosynthetic reactions. Such light sources may be typified by, as illustrated, optical fibers 74 and a light transmitting material 76 locally deposited on the optical fibers 74 and having a refractive index which is larger than that of the optical fibers 74. In this construction, light propagating through the optical fibers 74 will stream to the outside at each of the locations where the light transmissive material 76 is deposited.

The optical fibers 74 are bundled up at upper ends thereof to be optically connected to a fiber optic cable 78 by an optical coupling 80. At the end remote from the fibers 74, the cable 78 faces a lens assembly which functions to focus light emanating from a light source, which may be the sun or an artificial light source such as a xenon lamp. In operation, light converged by the lens assembly into the fiber optic cable 78 will propagate therethrough to the optical fibers 74 so as to irradiate the plant P streaming through the light transmissive material 76.

As previously described, the sealed chamber 56 is defined by the transparent housing 52 to allow one to see the interior of the chamber. To gather fruit hanging on the plant P, one may enter the chamber 56 after replacing the $CO_2$-containing, hot and humid air by ordinary clean air. Alternatively, a number of openable windows may be formed in the housing 52 to allow one to gather the fruits by reaching out his or her hands through the windows.

It will be apparent that the principle discussed in conjuction with the stomata of the plant P in the first embodiment is applicable to the second embodiment as well.

In summary, it will be seen that the present invention provides an apparatus for plant cultivation which effectively raises a plant with a simple and compact construction and without effecting the atmosphere which human beings enjoy.

Various modifications will become possible for those skilled in the art after receiving the teaching of the present disclosure without departing from the scope thereof.

What is claimed is:

1. Apparatus for cultivating plants comprising a base member for supporting a plant, said base member defining a sealed dark chamber in which the root section of said plant is accommodated, said base member having an opening through which the stems of the plant pases, a support assembly mounted on said base member and extending upwardly from said base member for supporting the stem and leaf sections of the plant, said support assembly having lighting means, said lighting means comprising a plurality of upright column means, each of said column means comprising an elongated transparent tube in which an elongated, transparent, triangular member is coaxially disposed, said triangular member having a triangular cross section with three sides, elongated optical fibers disposed in said transparent tube between the inner wall of the transparent tube and the sides of said triangular member, and a light source means providing light from a light source to said optical fibers such that the light is propagated through said optical fibers and is reflected by said triangular member to radiate light onto the plant.

2. An apparatus as claimed in claim 1, wherein said support assembly further comprises beams connected to said column means to form a support structure.

3. An apparatus as claimed in claim 1, wherein said optical fibers contact the sides of said triangular member.

4. An apparatus as claimed in claim 3, wherein said optical fibers are fixed to the sides of said triangular member.

5. An apparatus as claimed in claim 1, wherein there are optical fibers contacting all the three sides of said triangular member.

6. An apparatus as claimed in claim 1 further comprising a transparent cover member mounted on said base member and defining a sealed compartment in which said support assembly and plant are sealed, and means for feeding carbon dioxide to said sealed compartment to effect photosynthesis, said lighting means providing light to said plant within said sealed compartment.

7. An apparatus as claimed in claim 1, in which the light source is the sum.

8. An apparatus as claimed in claim 1, in which the light source is an artificial light source.

9. An apparatus as claimed in claim 1, further comprising a transparent housing for enclosing the support assembly and the lighting means to define a sealed lighted chamber above the base member.

10. An apparatus as claimed in claim 6, in which air containing a high concentration of carbon dioxide is fed into the lighted chamber.

11. An apparatus as claimed in claim 9, further comprising a curtain for selectively screening the housing from externally derived light rays.

12. An apparatus as claimed in claim 1, further comprising means for supplying at least culture liquid and air to the dark chamber.

13. An apparatus as claimed in claim 1, in which the supply of light from the lighting means occurs intermittently.

14. Apparatus for cultivating plants comprising a base member for supporting a plant, said base member defining a sealed dark chamber in which the root section of said plant is accommodated, said base member having an opening through which the stem of the plant passes, a support assembly mounted on said base member and extending upwardly from said base member for supporting the stem and leaf section of the plant, said support assembly having lighting means, said lighting means comprising a plurality of upright column means, said support assembly further comprising beams connected to said column means to form a support structure, each of said column means comprising an elongated transparent tube in which an elongated, transparent, triangular member is coaxially disposed, said triangular member having a triangular cross section with three sides, elongated optical fibers disposed in said transparent tube between the inner wall of the transparent tube and the sides of said triangular member, said optical fibers being in contact with and being fixed to the sides of said triangular member, a light source means providing light from a light source to said optical fibers such that the light is propagated through said optical fibers and is reflected by said triangular member to radiate light to the plant, said transparent cover member being mounted on said base member and defining a sealed compartment in which said support assembly and plant are sealed, and means for feeding carbon dioxide to said sealed compartment to effect photosynthesis, said lighting means providing light to said plant within said sealed compartment.

* * * * *